Aug. 15, 1967   R. H. ANDERSON   3,335,904
STORAGE CONTAINERS
Filed Feb. 28, 1964
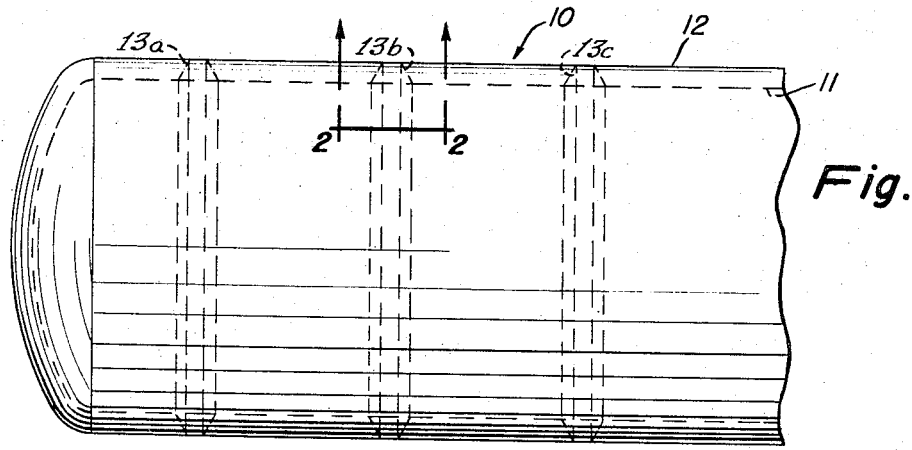
Fig. 1
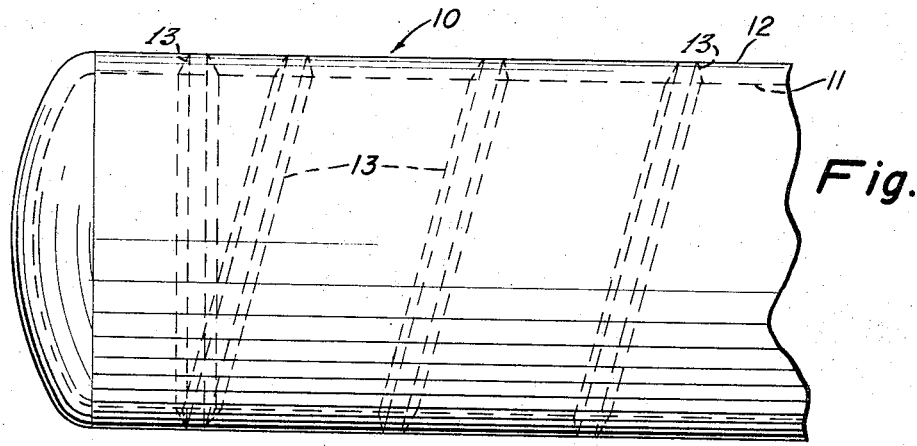
Fig. 5
Fig. 2
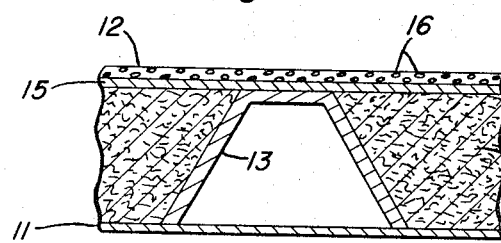
Fig. 3
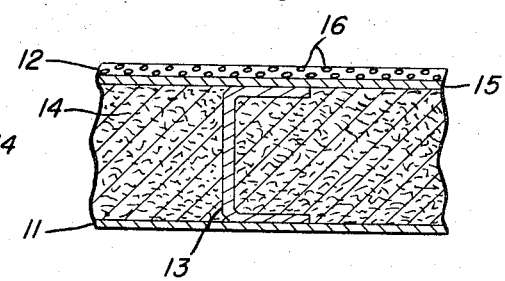
Fig. 4
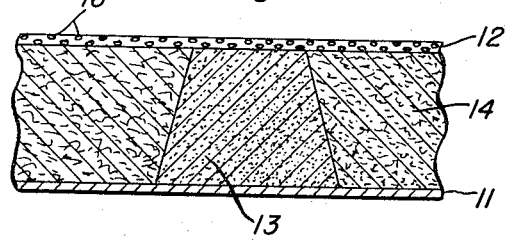
INVENTOR.
Robert H. Anderson
BY Edwin C. Lehner
ATTORNEY

United States Patent Office 3,335,904
Patented Aug. 15, 1967

3,335,904
STORAGE CONTAINERS
Robert H. Anderson, Elmhurst, Ill., assignor to Standard Oil Company, Chicago, Ill., a corporation of Indiana
Filed Feb. 28, 1964, Ser. No. 348,245
3 Claims. (Cl. 220—83)

This invention relates to storage tanks. More particularly, it relates to glass fiber reinforced plastic tanks especially adaptable for underground storage of liquid hydrocarbons and to a method of preparation thereof.

The petroleum industry conventionally uses metal tanks for the underground storage of liquid hydrocarbons, such as gasoline and fuel oil, especially at service stations. It is well known that the service life of such tanks is extremely variable depending upon the environment in which the tanks are buried. In some locations the service life of a steel tank is sometimes less than one year, even though these tanks have a wall thickness of $\frac{3}{16}''-\frac{1}{4}''$, due to extremely corrosive environment; whereas in other locations the life of the tank may be as much as 30 years. Frequent replacement of metal tanks is required when used in highly corrosive soils or environments. Thus, large economic losses accrue both from the loss of the tank itself and from the cost incurred in its replacement. Many techniques have been suggested for protecting underground metal storage tanks against corrosion, such as use of anodic "decoy" material and other cathodic protection techniques or by painting or coating with protective materials. However, such techniques have proven unsatisfactory for protecting metal tanks against corrosion. Thus, there is a critical need in the industry for a suitable non-metallic storage tank that can be effectively used for the underground storage of liquid hydrocarbons at atmospheric pressure.

Non-pressurized storage tanks constructed from non-metallic materials must be capable of withstanding the internal and external forces which are placed upon the tank in normal use. Underground service station tanks are normally buried under the driveways and covered with about 30 inches of earth. In some locations, high water table conditions exist so that the tanks must be provided with hold-down means, which conditions impose extreme forces resulting from up-lift and hold-down. In addition, such buried tanks are subjected to periodic vehicle axle loads that may range from 15–20,000 pounds, and the non-metallic tank must be capable of withstanding such periodic loads without damage or deformation. A suitable non-metallic tank for such purposes must have all of the desirable characteristics and qualifications of metal tanks, as well as being chemically inert to the contents and to the environment in which it is placed. Further, the capacity of the non-metallic storage tanks should be equivalent to the capacity of the metal tanks which normally ranges from 500 to 10,000 gallons.

An object of the invention is to provide a non-metallic storage tank suitable for storage of liquids at atmospheric pressure. A further object of the invention is to provide a glass fiber reinforced plastic tank suitable for the underground storage of gasoline and fuel oil. A still further object of the invention is to provide a method for making a strong, rigid, hollow tank of novel construction, which is fluid-tight and not subject to corrosion.

Plastic sandwich wall tanks are frequently used for the storage of liquid. However, such tanks as normally constructed from relatively thin glass fiber reinforced plastic sheets as the material for the inner and outer skins do not possess adequate circumferential strength for use as underground liquid storage tanks in locations where the tanks are subjected to periodic force stresses of substantial magnitude, such as occur in tanks used as service station storage tanks.

In accordance with the present invention, a non-metallic horizontal storage tank especially suitable for the underground storage of liquid hydrocarbons is provided by a plastic sandwich construction having an enclosing wall forming a tubular body portion and end walls defining a substantially closed hollow structure, said tank including an inner skin and an outer skin spaced therefrom and including core material of relatively low structural strength between said skins, the tubular body portion having circumferential reinforcing rib means between said inner and outer skins. The tubular body portion is structurally reinforced against circumferential deformation by circumferential reinforcing rib means disposed between the inner and outer skins. Said rib means can be either a continuous rib in the form of a helix or a plurality of individual ribs spaced at intervals along the longitudinal axis of the tubular body portion.

For a more complete understanding of the present invention, reference is made to the accompanying drawings where like reference numerals refer to like parts throughout the views, in which: FIG. 1 is a side view of one end of the tank; FIG. 2 is a cross-sectional view on an enlarged scale taken at line 2—2 of FIG. 1 illustrating wall and reinforcing rib construction; FIGURES 3 and 4 are enlarged cross-sectional views similar to FIG. 2 illustrating alternative embodiments; FIG. 5 is a side view of one end of a tank provided with a continuous helical reinforcing rib.

In FIG. 1, the plastic sandwich wall construction of tank 10 comprises an inner skin 11 and an outer skin 12 of thin glass reinforced plastic sheet material. The tubular body portion is provided with circumferential reinforcing means 13a, 13b and 13c disposed between skins 11 and 12 to provide adequate strength in the tank wall against circumferential deformation. The details of the wall and rib construction are shown in FIGURES 2–4.

In FIGURES 2–4, inner skin 11 is a relatively thin gauge sheet of glass reinforced plastic material. Outer skin 12 is a plurality of layers of continuous glass-filament winding 16 embedded in a thermoset resin. The windings 16 are at an angle less than 90° to form a helical configuration. Positioned between skins 11 and 12 is reinforced rib 13 and core material 14 of relatively low structural strength. In FIGURES 2 and 3, an alternative layer 15 of plastic material similar to skin 11 is shown between skin 12 and core material 14 to provide a base for windings 16. In FIG. 4, outer skin 12 is formed directly over the core material 14 and rib 13.

Reinforcing rib 13 can be constructed in any desired configuration from any non-corrosive material that has structural strength. Preferably, the rib is hollow and of a trapezoidal cross sectional configuration as shown in FIG. 2. However, the rib can be U-shaped, FIG. 3, or solid, FIG. 4. It is preferable to use glass fiber reinforced plastic as the rib material, thereby avoiding any problems that might arise from the use of dissimilar materials.

Conventional fabricating techniques used in the plastic industry for the fabrication of sandwich wall vessels are suitable to manufacture the tanks of this invention.

Conventional thermosetting resins known to the art can be used such as epoxy, phenolic, or unsaturated polyesters, to form the glass reinforced plastic skins. The preferred thermosetting resin, for optimum corrosion resistance, is a polymerizable mixture of about 55–65 parts of unsaturated isophthalic acid polyester resin and about 35–45 parts of styrene. The preferred polyester resin is prepared conventionally from 1 mole isophthalic acid, 1 mole of maleic anhydride, and 2.2 moles of propylene glycol, and has an acid number of less than 15 and a hydroxyl number less than 30. Catalytic curing of the thermosetting resin is used in accordance with conventional curing techniques. The preferred catalyst system for the isophthalic polyester-styrene thermosetting resin is about 0.2% cobalt naphthenate and about 1% methylethyl ketone peroxide. It is to be understood that choice of fabrication techniques, glass and thermosetting resin content of the skins can be varied broadly and still give the proper chemical inertness and structural strength to the tank.

A plastic tank having a capacity of about 4000 gallons is about 20 feet long and 6 feet in diameter. Parallel circumferential reinforcing ribs about 1.5 inches thick, having a trapezoidal cross-section located on about 12 inch centers along the tubular portion of the tank yield a tank having structural strength essentially equivalent to a steel tank of similar dimensions.

Horizontal plastic tanks made in accordance with this invention are unitary structures substantially free from corrosive attack by environment and contents. The tank has high strength to unit weight and does not require the protective techniques or coatings that metal tanks require. Products stored in the plastic tanks are free from contamination by the normal products of corrosion of internal surfaces of metal tanks. Frequent and expensive replacement of metal tanks in service stations located in highly corrosive locations is obviated by the plastic tanks of the invention. Tanks of similar construction but of smaller capacity can be used for residential storage of fuel oils.

I claim:

1. A storage container suitable for storing fluids underground, said container having a structure capable of withstanding substantial forces of deformation, said container also having a plastic sandwich-type construction of the unitary enclosing wall defining a tubular body portion and outwardly extending end walls forming a closed rigid non-metallic container structure, said walls of the tubular portion and the ends walls comprising an inner layer and an outer layer spaced therefrom to accommodate a core of low structural strength material between said layers, said wall of the tubular portion having reinforcing rib means spaced along the longitudinal axis of said tubular portion, said rib includes a continuous rib in the form of a helix along the longitudinal axis and around said tubular portion of said container, said rib means having a trapezoidal cross section and being located in said space between said inner layer and said outer layer and within said core material.

2. The container structure of claim 1 wherein said rib means have a hollow trapezoidal cross section, said inner layer comprising glass reinforced plastic material, and said outer layer comprising an inner skin of glass reinforced plastic material covered by a thickness of continuous glass-filament windings defining an angle of less than 90° with the longitudinal axis of said tubular portion.

3. The container structure of claim 1 wherein said rib means have a closed solid trapezoidal cross section, said inner layer comprising glass reinforced plastic material, and said outer layer comprising a thickness of continuous glass filament windings defining an angle of less than 90° with the longitudinal axis of said tubular portion.

References Cited

UNITED STATES PATENTS

| | | | |
|---|---|---|---|
| 2,714,516 | 8/1955 | Brown | 220—15 X |
| 2,744,043 | 5/1956 | Ramberg. | |
| 2,767,962 | 10/1956 | Blackburn | 220—15 X |
| 3,158,383 | 11/1964 | Anderson | 220—9 X |
| 3,163,435 | 12/1964 | Krueger | 220—9 X |
| 3,215,576 | 11/1965 | Huff | 220—3 X |

THERON E. CONDON, *Primary Examiner.*

GEORGE E. LOWRANCE, *Examiner.*